(12) United States Patent
Schneider et al.

(10) Patent No.: US 10,338,192 B2
(45) Date of Patent: *Jul. 2, 2019

(54) RADIO FREQUENCY COMMUNICATION SYSTEM

(71) Applicant: Position Imaging, Inc., Portsmouth, NH (US)

(72) Inventors: Mark Schneider, Williston, VT (US); Yi Cao, Somerville, NJ (US)

(73) Assignee: POSITION IMAGING, INC., Portsmouth, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/244,725

(22) Filed: Jan. 10, 2019

(65) Prior Publication Data

US 2019/0146057 A1 May 16, 2019

Related U.S. Application Data

(63) Continuation of application No. 13/975,724, filed on Aug. 26, 2013, now Pat. No. 10,180,490.
(Continued)

(51) Int. Cl.
*H04W 24/00* (2009.01)
*G01S 5/02* (2010.01)

(52) U.S. Cl.
CPC ................. *G01S 5/0294* (2013.01)

(58) Field of Classification Search
CPC ....... H04W 24/00; H04W 4/026; H04W 4/00; H04W 4/02; H04W 4/021; G01S 5/0294;
(Continued)

(56) References Cited

U.S. PATENT DOCUMENTS 3,824,596 A 7/1974 Guion et al.
3,940,700 A 2/1976 Fischer
(Continued)

FOREIGN PATENT DOCUMENTS

WO 2001006401 A1 1/2001
WO WO-2005010550 A1 * 2/2005 ............. G01S 3/043

OTHER PUBLICATIONS

Non-Final Office Action in U.S. Appl. No. 13/975,724 dated Jul. 8, 2016; 13 pages.
(Continued)

*Primary Examiner* — Mahendra Patel
(74) *Attorney, Agent, or Firm* — Schmeiser, Olsen & Watts LLP

(57) ABSTRACT

A system and method for recovering from a failure during the position tracking of an RF-transmitting device includes tracking the position of the radio frequency (RF) transmitting device based on RF signals emitted by the RF-transmitting device. If the tracking loses the position of the RF-transmitting device, new phase difference data are calculated from the RF signals transmitted by the RF-transmitting device and received at four or more antennas. A subset of candidate position solutions for evaluation is identified based on the new phase difference data. One or more of the candidate position solutions in the subset is evaluated to find an acceptable position solution. The tracking of the position of the RF-transmitting device resumes using the acceptable position solution.

18 Claims, 4 Drawing Sheets

Related U.S. Application Data

(60) Provisional application No. 61/692,787, filed on Aug. 24, 2012.

(58) Field of Classification Search
CPC ............ G01S 5/02; G01S 5/06; G01S 5/0221; G08G 1/207; G08B 21/18; G08B 21/00; H04B 7/08; H04B 17/27; H04B 7/0888
USPC ................ 455/456.1, 457; 340/10.2, 539.13
See application file for complete search history.

(56) References Cited

U.S. PATENT DOCUMENTS

| | | |
|---|---|---|
| 4,328,499 A | 5/1982 | Anderson et al. |
| 5,010,343 A | 4/1991 | Andersson |
| 5,343,212 A | 8/1994 | Rose et al. |
| 5,426,438 A | 6/1995 | Peavey et al. |
| 5,510,800 A | 4/1996 | McEwan |
| 5,574,468 A | 11/1996 | Rose |
| 5,592,180 A | 1/1997 | Yokev et al. |
| 5,600,330 A | 2/1997 | Blood |
| 5,657,026 A | 8/1997 | Culpepper et al. |
| 5,923,286 A | 7/1999 | Divakaruni |
| 5,953,683 A | 9/1999 | Hansen et al. |
| 6,167,347 A | 12/2000 | Lin |
| 6,255,991 B1 | 7/2001 | Hedin |
| 6,292,750 B1 | 9/2001 | Lin |
| 6,409,687 B1 | 6/2002 | Foxlin |
| 6,417,802 B1 | 7/2002 | Diesel |
| 6,496,778 B1 | 12/2002 | Lin |
| 6,512,748 B1 | 1/2003 | Mizuki et al. |
| 6,593,885 B2 | 7/2003 | Wisherd et al. |
| 6,630,904 B2 | 10/2003 | Gustafson et al. |
| 6,683,568 B1 | 1/2004 | James et al. |
| 6,697,736 B2 | 2/2004 | Lin |
| 6,721,657 B2 | 4/2004 | Ford et al. |
| 6,750,816 B1 | 6/2004 | Kunysz |
| 6,861,982 B2 | 3/2005 | Forstrom et al. |
| 6,989,789 B2 | 1/2006 | Ferreol et al. |
| 7,009,561 B2* | 3/2006 | Menache ................ A63F 13/06 340/539.13 |
| 7,143,004 B2 | 11/2006 | Townsend et al. |
| 7,168,618 B2 | 1/2007 | Schwartz |
| 7,190,309 B2 | 3/2007 | Hill |
| 7,193,559 B2 | 3/2007 | Ford et al. |
| 7,236,091 B2 | 6/2007 | Kiang et al. |
| 7,292,189 B2 | 11/2007 | Orr et al. |
| 7,295,925 B2 | 11/2007 | Breed et al. |
| 7,409,290 B2 | 8/2008 | Lin |
| 7,443,342 B2 | 10/2008 | Shirai et al. |
| 7,499,711 B2* | 3/2009 | Hoctor ...................... G01S 5/06 455/404.2 |
| 7,533,569 B2 | 5/2009 | Sheynblat |
| 7,612,715 B2 | 11/2009 | Macleod |
| 7,646,330 B2 | 1/2010 | Karr |
| 7,868,760 B2 | 1/2011 | Smith et al. |
| 7,876,268 B2* | 1/2011 | Jacobs ................. G01S 5/0215 342/465 |
| 7,933,730 B2* | 4/2011 | Li ......................... A61B 90/36 324/207.16 |
| 8,269,624 B2 | 9/2012 | Chen et al. |
| 8,457,655 B2 | 6/2013 | Zhang et al. |
| 8,749,433 B2 | 6/2014 | Hill |
| 8,957,812 B1 | 2/2015 | Hill et al. |
| 9,063,215 B2 | 6/2015 | Perthold et al. |
| 9,120,621 B1 | 9/2015 | Curlander et al. |
| 9,482,741 B1* | 11/2016 | Min ........................ H04W 4/029 |
| 9,497,728 B2 | 11/2016 | Hill |
| 9,519,344 B1 | 12/2016 | Hill |
| 9,782,669 B1 | 10/2017 | Hill |
| 9,872,151 B1 | 1/2018 | Puzanov et al. |
| 9,933,509 B2* | 4/2018 | Hill ....................... G01S 5/0294 |
| 9,961,503 B2 | 5/2018 | Hill |
| 10,001,833 B2 | 6/2018 | Hill |
| 2002/0021277 A1 | 2/2002 | Kramer et al. |
| 2002/0140745 A1* | 10/2002 | Ellenby ................. G01C 21/20 715/848 |
| 2003/0053492 A1 | 3/2003 | Matsunaga |
| 2003/0120425 A1* | 6/2003 | Stanley ................ G01C 21/165 701/500 |
| 2003/0176196 A1* | 9/2003 | Hall ...................... G01S 5/0205 455/456.1 |
| 2003/0195017 A1 | 10/2003 | Chen et al. |
| 2004/0095907 A1 | 5/2004 | Agee et al. |
| 2004/0176102 A1 | 9/2004 | Lawrence et al. |
| 2004/0203846 A1 | 10/2004 | Caronni et al. |
| 2005/0057647 A1* | 3/2005 | Nowak .................. G06K 9/209 348/116 |
| 2005/0143916 A1 | 6/2005 | Kim et al. |
| 2005/0184907 A1 | 8/2005 | Hall et al. |
| 2005/0275626 A1 | 12/2005 | Mueller et al. |
| 2006/0013070 A1 | 1/2006 | Holm et al. |
| 2006/0061469 A1 | 3/2006 | Jaeger et al. |
| 2006/0066485 A1* | 3/2006 | Min ......................... G01S 5/06 342/465 |
| 2006/0101497 A1 | 5/2006 | Hirt et al. |
| 2006/0279459 A1 | 12/2006 | Akiyama et al. |
| 2006/0290508 A1 | 12/2006 | Moutchkaev et al. |
| 2007/0060384 A1 | 3/2007 | Dohta |
| 2007/0138270 A1 | 6/2007 | Reblin |
| 2007/0205867 A1 | 9/2007 | Kennedy et al. |
| 2007/0210920 A1 | 9/2007 | Panotopoulos |
| 2007/0222560 A1 | 9/2007 | Posamentier |
| 2008/0048913 A1 | 2/2008 | Macias et al. |
| 2008/0143482 A1 | 6/2008 | Shoarinejad et al. |
| 2008/0150678 A1* | 6/2008 | Giobbi ................... G07F 17/32 340/5.2 |
| 2008/0154691 A1 | 6/2008 | Wellman et al. |
| 2008/0174485 A1* | 7/2008 | Carani ................... G06Q 10/08 342/357.46 |
| 2008/0204322 A1 | 8/2008 | Oswald et al. |
| 2008/0266253 A1* | 10/2008 | Seeman ................ G06F 3/0346 345/158 |
| 2008/0316324 A1 | 12/2008 | Rofougaran et al. |
| 2009/0043504 A1* | 2/2009 | Bandyopadhyay .... G01C 17/38 701/469 |
| 2009/0149202 A1 | 6/2009 | Hill et al. |
| 2009/0243932 A1 | 10/2009 | Moshfeghi |
| 2010/0090852 A1* | 4/2010 | Eitan ..................... G08G 1/207 340/686.1 |
| 2010/0097208 A1* | 4/2010 | Rosing ................. G06Q 10/087 340/539.13 |
| 2010/0103173 A1 | 4/2010 | Lee et al. |
| 2010/0103989 A1 | 4/2010 | Smith et al. |
| 2010/0123664 A1 | 5/2010 | Shin et al. |
| 2010/0159958 A1* | 6/2010 | Naguib ................. G01S 5/021 455/457 |
| 2011/0006774 A1 | 1/2011 | Baiden |
| 2011/0037573 A1 | 2/2011 | Choi |
| 2011/0187600 A1 | 8/2011 | Landt |
| 2011/0208481 A1 | 8/2011 | Slastion |
| 2011/0210843 A1 | 9/2011 | Kummetz |
| 2011/0241942 A1 | 10/2011 | Hill |
| 2011/0256882 A1 | 10/2011 | Markhovsky et al. |
| 2012/0013509 A1 | 1/2012 | Wisherd et al. |
| 2012/0127088 A1 | 5/2012 | Pance et al. |
| 2012/0176227 A1* | 7/2012 | Nikitin ................ G06K 7/10356 340/10.2 |
| 2012/0184285 A1 | 7/2012 | Sampath et al. |
| 2012/0286933 A1 | 11/2012 | Hsiao |
| 2012/0319822 A1 | 12/2012 | Hansen |
| 2013/0021417 A1 | 1/2013 | Ota et al. |
| 2013/0036043 A1 | 2/2013 | Faith |
| 2013/0314210 A1 | 11/2013 | Schoner et al. |
| 2014/0022058 A1 | 1/2014 | Striemer et al. |
| 2014/0253368 A1* | 9/2014 | Holder ................. G01S 13/003 342/146 |
| 2014/0300516 A1 | 10/2014 | Min et al. |
| 2014/0361078 A1 | 12/2014 | Davidson |
| 2015/0009949 A1 | 1/2015 | Khoryaev et al. |
| 2015/0039458 A1 | 2/2015 | Reid |
| 2015/0091757 A1 | 4/2015 | Shaw et al. |
| 2015/0130664 A1 | 5/2015 | Hill et al. |

(56) References Cited

U.S. PATENT DOCUMENTS

| | | |
|---|---|---|
| 2015/0169916 A1 | 6/2015 | Hill et al. |
| 2015/0221135 A1 | 8/2015 | Hill et al. |
| 2015/0323643 A1 | 11/2015 | Hill et al. |
| 2015/0362581 A1 | 12/2015 | Friedman et al. |
| 2015/0379366 A1 | 12/2015 | Nomura et al. |
| 2016/0142868 A1 | 5/2016 | Kulkarni et al. |
| 2016/0156409 A1 | 6/2016 | Chang |
| 2016/0178727 A1 | 6/2016 | Bottazzi |
| 2016/0256100 A1 | 9/2016 | Jacofsky et al. |
| 2016/0286508 A1 | 9/2016 | Khoryaev et al. |
| 2016/0366561 A1 | 12/2016 | Min et al. |
| 2016/0370453 A1 | 12/2016 | Boker et al. |
| 2016/0371574 A1 | 12/2016 | Nguyen et al. |
| 2017/0030997 A1 | 2/2017 | Hill et al. |
| 2017/0031432 A1 | 2/2017 | Hill |
| 2017/0234979 A1 | 8/2017 | Mathews et al. |
| 2017/0323174 A1 | 11/2017 | Joshi et al. |
| 2017/0350961 A1 | 12/2017 | Hill et al. |
| 2017/0372524 A1 | 12/2017 | Hill |
| 2018/0231649 A1 | 8/2018 | Min et al. |
| 2018/0242111 A1 | 8/2018 | Hill |
| 2019/0053012 A1 | 2/2019 | Hill |

OTHER PUBLICATIONS

Final Office Action in U.S. Appl. No. 13/975,724 dated Dec. 22, 2016; 15 pages.
Non-Final Office Action in U.S. Appl. No. 13/975,724 dated Jun. 27, 2017; 18 pages.
Final Office Action in U.S. Appl. No. 13/975,724 dated Jan. 12, 2018; 14 pages.
Notice of Allowance in U.S. Appl. No. 13/975,724 dated Nov. 13, 2018; 12 pages.
Wilde, Andreas, "Extended Tracking Range Delay-Locked Loop," Proceedings IEEE International Conference on Communications, Jun. 1995, pp. 1051-1054.
Li, Xin, et al. "Multifrequency-Based Range Estimation of RFID Tags," 2009, IEEE.
Welch, Greg and Gary Bishop "An Introduction to the Kalman Filter, TR95-041," Department of Computer Science, University of North Carolina at Chapel Hill, Chapel Hill, NC 27599-3175, Updated: Monday, Jul. 24, 2006.
Schumacher, Adrian "Integration of a GPS aided Strapdown Inertial Navigation System for Land Vehicles", Master of Science Thesis, KTH Electrical Engineering, 2006; 67 pages.
Sun, Debo "Ultra-Tight GPS/Reduced IMU for Land Vehicle Navigation", Mar. 2010, UCGE Reports No. 20305; 254 pages.
Farrell and Barth, "The Global Positioning System & Interial Navigation", 1999, McGraw-Hill; pp. 245-252.
Farrell, et al. "Real-Time Differential Carrier Phase GPS-Aided INS", Jul. 2000, IEEE Transactions on Control Systems Technology, vol. 8, No. 4; 13 pages.
Filho, et al. "Integrated GPS/INS Navigation System Based on a Gyroscope-Free IMU", DINCON Brazilian Conference on Synamics, Control, and Their Applications, May 22-26, 2006; 6 pages.
Goodall, Christopher L. , "Improving Usability of Low-Cost INS/GPS Navigation Systems using Intelligent Techniques", Jan. 2009, UCGE Reports No. 20276; 234 pages.
Grewal and Andrews "Global Positioning Systems, Inertial Navigation, and Integration" Section 8.6-8.6.3.1, 2001, John Weiley and Sons, pp. 252-256.
Gautier, Jennifer Denise "GPS/INS Generalized Evaluation Tool (GIGET) for the Design and Testing of Integrated Navigation Systems", Dissertation, Stanford University, Jun. 2003; 160 pages.
Gao, Jianchen "Development of a Precise GPS/INS/On-Board Vehicle Sensors Integrated Vehicular Positioning System", Jun. 2007, UCGE Reports No. 20555; 245 pages.
Pourhomayoun, Mohammad and Mark Fowler "Improving WLAN-based Indoor Mobile Positioning Using Sparsity," Conference Record of the Forty Sixth Asilomar Conference on Signals, Systems and Computers, Nov. 4-7, 2012, pp. 1393-1396, Pacific Grove, California.
Proakis, John G. and Masoud Salehi, "Communication Systems Engineering", Second Edition, Prentice-Hall, Inc., Upper Saddle River, New Jersey, 2002; 815 pages.
Alban, Santago "Design and Performance of a Robust GPS/INS Attitude System for Automobile Applications", Dissertation, Stanford University, Jun. 2004; 218 pages.
Schmidt and Phillips, "INS/GPS Integration Architectures", NATO RTO Lecture Seriers, First Presented Oct. 20-21, 2003; 24 pages.
Sun, et al., "Analysis of the Kalman Filter With Different INS Error Models for GPS/INS Integration in Aerial Remote Sensing Applications", Bejing, 2008, The International Archives of the Photogrammerty, Remote Sensing and Spatial Information Sciences vol. XXXVII, Part B5.; 8 pages.
Vikas Numar N. "Integration of Inertial Navigation System and Global Positioning System Using Kalman Filtering", M.Tech Dissertation, Indian Institute of Technology, Bombay, Mumbai, Jul. 2004; 69 pages.
Yang, Yong "Tightly Coupled MEMS INS/GPS Integration with INS Aided Receiver Tracking Loops", Jun. 2008, UCGE Reports No. 20270; 205 pages.
"ADXL202/ADXL210 Product Sheet", Analog Devices, Inc., Analog.com, 1999.

* cited by examiner

RADIO FREQUENCY COMMUNICATION SYSTEM

RELATED APPLICATIONS

This application is a continuation of U.S. patent application Ser. No. 13/975,724 filed Aug. 26, 2013, titled "Radio Frequency Communication System," which claims priority to U.S. provisional application No. 61/692,787, filed Aug. 24, 2012, titled "Radio Frequency Communication System," the entirety of each of which is incorporated by reference herein.

FIELD OF THE INVENTION

The invention relates generally to systems and methods of radio frequency (RF) communication. More particularly, the invention relates to systems and methods for tracking the position of RF transmitting devices.

BACKGROUND

A commonly used method to track the position of a radio signal transmitting device is to use the time difference of arrival (or, equivalently, the phase difference of arrival) at various receivers or receiver antennae (receivers) disposed at known locations, to determine the position of the RF transmitting device. By solving the non-linear equations associated with such systems, the position of the RF transmitting device can be determined. Because phase ($\theta$) and time (t) are related by $\theta=\omega t$, where $\omega$ is a scalar, phase and time are equivalent systems and subsequent descriptions are denoted by time or time differences, as appropriate.

Typically, position tracking systems require at least three or four receivers at known positions to determine a two-dimensional or three-dimensional position recording of the RF transmitting device. An example of an embodiment can contain a receiver channel that includes one antenna, one receiver, phase correlation circuitry for comparing the RF transmitting device signal's time difference of arrival, ADC circuitry, and a processor for processing the timing data. Many tracking systems use just one processor that receives data from each receiver channel with each receiver channel including both receiver hardware and the antenna.

Certain computer-based applications track the position of an interactive peripheral device (i.e., RF transmitting device) and use that position data to engage a software program requiring high tracking accuracy. In these applications, the RF transmitting device is registered with screen images provided by software. To make this RF transmitting device's operation effective for a user (e.g., to control a cursor on a screen) highly accurate positions are required to provide realistic interaction between the user operating the RF transmitting device and the software program. A signal time of arrival comparison approach for RF transmitting device tracking can provide these higher accuracies.

A problem with such position tracking systems is the reduction in accuracy due to multipath interference and other line-of-sight blockage issues. Multipath interference is a phenomenon whereby a wave from a source travels to a detector via two or more paths and causes the detector to receive two (or more) components of the wave. Complete line-of-sight blockage can occur when an object comes between the source and detector. During a multi-player game, for example, one player can inadvertently block the transmitter used by another player.

SUMMARY

In one aspect, the invention features a method of recovering from a lost position in a position tracking system. The method comprises tracking a position of a radio frequency (RF) transmitting device based on RF signals emitted by the RF-transmitting device. If the tracking loses the position of the RF-transmitting device, new phase difference data are calculated from RF signals transmitted by the RF-transmitting device and received at four or more antennas, for use in recovering the position of the RF transmitting device. A subset of candidate position solutions for evaluation is identified based on the new phase difference data. One or more of the candidate position solutions in the subset are evaluated to find an acceptable position solution. The tracking of the position of the RF-transmitting device resumes using the acceptable position solution.

In another aspect, the invention features a position tracking system for recovering from a failure during position tracking of an RF-transmitting device. The position tracking system comprises a network of four or more spatially separated antennas fixed at different locations. The four or more antennas receive RF signals sent from the RF-transmitting device. A first processor is programmed to calculate a position of RF-transmitting device based on time of arrival information of the RF signals received by the four or more antennas. A data processor is programmed to calculate, if tracking of the position of the RF-transmitting device becomes lost, new phase difference data from the RF signals transmitted by the RF-transmitting device and received at the four or more antennas, for use in recovering the position of the RF transmitting device. The data processor is further programmed to identify a subset of candidate position solutions for evaluation based on the new phase difference data, evaluate one or more of the candidate position solutions in the subset to find an acceptable position solution, and to resume the tracking of the position of the RF-transmitting device using the acceptable position solution.

DETAILED DESCRIPTION

Figure 1:
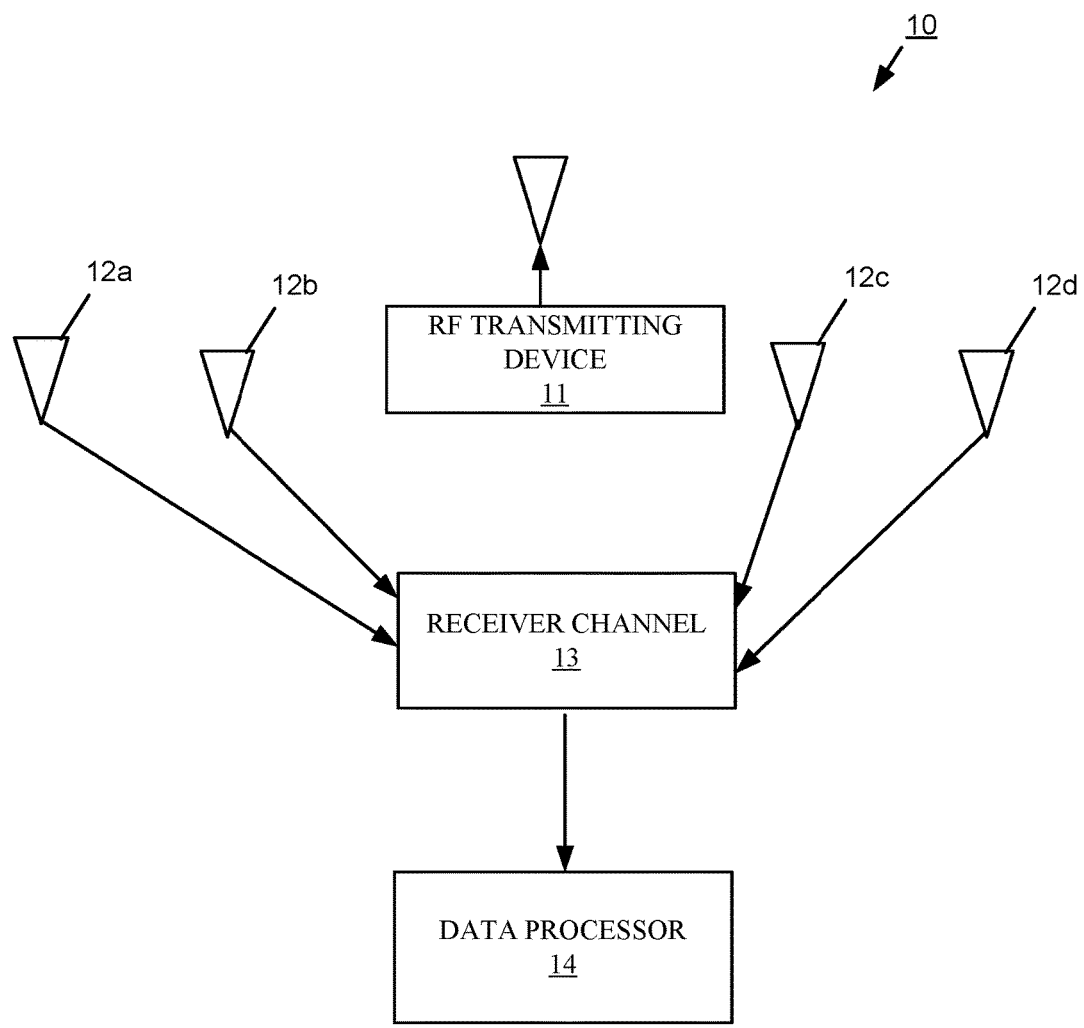
FIG. 1 is a block diagram showing an embodiment of a position tracking system with position recalibration capabilities.

Systems and methods described herein can effectively improve the performance of position tracking of RF transmitting devices by recovering from multipath interference and line-of-sight blockages. An RF communication system tracks the physical position of a wireless RF transmitting peripheral device (e.g., a computer mice, game controllers, etc.). An example embodiment of the RF communication system includes: a receiver network of four or more (for three-dimensional tracking) receiver antennae fixed at known physical positions that receive radio transmissions from one or more wireless mobile transmitters or RF transmitting devices; one or more receivers connected to the receiver antennae; a data processor that computes the relative position of each RF transmitting device through time difference of arrival between a reference receiver and all other receiver antennae. In the RF communication system, the data processor can compute the relative position of each RF transmitting device in two-dimensional or three-dimensional space by comparing the time of arrival at each receiver antenna with the reference receiver and correlating those time differences with the known physical position of each antenna to determine the position of the RF transmitting device.

For example, in one configuration for three-dimensional RF transmitting device position tracking, an RF transmitting device transmits an RF signal that is received by at least four receiver antennae. One receiver antenna acts as the reference antenna to compare the time difference of arrival of the RF transmitting device's RF signal at each of the other three receiver antennae. This timing information and the antennas' known positions allow the RF communication system, through triangulation or trilateration techniques, to determine the physical position of the RF transmitting device. Other techniques for calculating the position of the RF-transmitting device are described in U.S. patent application Ser. No. 13/079,800, filed Apr. 4, 2011, titled "Multiplexing Receiver System", the entirety of which application is incorporated by reference herein.

The receiver channel may or may not include a data processor, depending on application needs. For example, in a game console application, manufacturers may want data processing (with position calculation) to occur in the console processor that enables the receiver channel to end at the ADC circuit. In such an embodiment, the processor is separate from the receiver channel.

When the RF communication system operates with a RF transmitting device that transmits RF signals having a wavelength λ greater than the tracking distance from the receiver antennas, a single solution to the tracking algorithm is available. However, when the RF signals have a wavelength λ much smaller than the tracking distance, multiple position solutions to the tracking algorithm are possible. Because of the possibility of a multiple position solution, a tracking algorithm that uses cycle counts (i.e., full wavelengths) is preferable. This type of tracking algorithm starts at a known position solution and keeps track of the phase by adding or subtracting cycles appropriately as the position changes.

FIG. 1 shows an embodiment of a wireless position tracking system 10 including a transmitter 11 (RF transmitting device) carried by/attached to/embedded on an object whose position (x, y, z) is to be determined, a receiver network including the receiver channel's antennae 12a through 12d (generally 12), whose relative positions $(X_i, Y_i, Z_i)$ are known, a receiver channel 13 and a data processor 14. At least four receiver antennae and one transmitter are required for determining the three-dimensional transmitter position within the tracking environment. In position tracking system 10, the received signal (e.g., Code Division Multiple Access or CDMA) is sent to the receiver channel unit 13. The data obtained from receiver channel 13 are sent to the data processor 14. From the data, the data processor 14 calculates the position (x, y, z) of the RF transmitting device and can display that position on a computer screen, or provide the position to other applications for use.

In one embodiment, the data processor 14 calculates the position of the RF transmitting device by using equations with the known relative three-dimensional positions of the receiver antennae. An example of the tracking equations, where the subscript 1 represents the reference receiver antenna, follows:

$$f_1 = \sqrt{(x_2-x)^2+(y_2-y)^2+(z_2-z)^2} - \sqrt{(x_1-x)^2+(y_1-y)^2+(z_1-z)^2} \quad \text{(Eq. 1),}$$

$$f_2 = \sqrt{(x_3-x)^2+(y_3-y)^2+(z_3-z)^2} - \sqrt{(x_1-x)^2+(y_1-y)^2+(z_1-z)^2} \quad \text{(Eq. 2),}$$

$$f_3 = \sqrt{(x_4-x)^2+(y_4-y)^2+(z_4-z)^2} - \sqrt{(x_1-x)^2+(y_1-y)^2+(z_1-z)^2} \quad \text{(Eq. 3),}$$

where $(x_i, y_i, z_i, i=1, 2, 3, 4)$ are the positions of the receiver antennae and (x, y, z) is the position of the RF transmitting device being determined, $f_1$, $f_2$ and $f_3$ are the measured differences in distance, respectively, between antennae 1 and 2, antennae 1 and 3 and antennae 1 and 4. These equations can be solved using a Kalman filter or a least squares minimization algorithm to determine the position solution.

Figure 2:
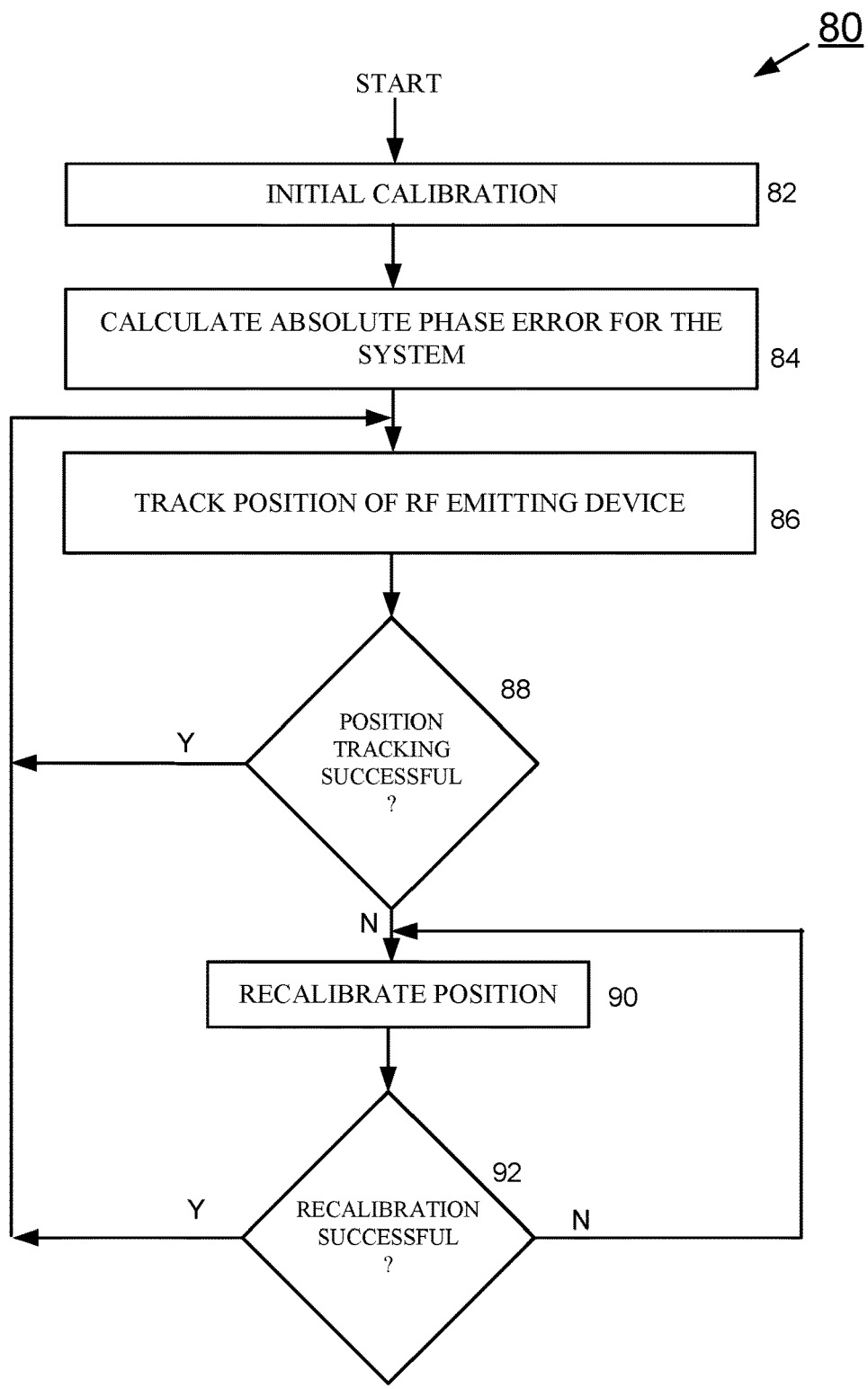
FIG. 2 is a flowchart of an embodiment of a process for tracking the position of an RF-transmitting device, including a position recalibration process for reestablishing position should position becomes momentarily lost.

FIG. 2 shows an embodiment of a process 80 for tracking the position of an RF transmitting device, including a position recalibration in the event the positing tracking process loses track of the device's position. In a description of the process 80, reference is made to the elements of FIG. 1. At step 82, an initial calibration is performed on the RF communication system 10. During the initial calibration, the RF transmitting device 11 is disposed at a known location. An absolute phase error is calculated (step 84) for all phase difference data between each antenna and the reference antenna, by using the present position solution from step 82 and changing the position into phase data using the known signal wavelength λ (for example, a transmitted 2.4 Ghz RF signal has approximately a 0.125 m wavelength). In general, the absolute phase error is equal to: 360*(distance{k}−distance {k−1})/λ−observation{k}), where distance{k}, where k=1, 2, 3, 4, . . . represents the distance between the RF transmitting device and antenna k, and where distance{k−1}, where k=1, 2, 3, 4, . . . represents the distance between the RF transmitting device and antenna k−1, and where observation{k} represents the current phase difference measurement.

At step 86, the RF communication system 10 tracks the position of the RF transmitting device 11, as described in connection with FIG. 1. The process 80 continues to track position for as long as the position tracking remains (step 88) successful. If the position tracking fails, the process 80 attempts (step 90) to perform position recalibration. If position recalibration succeeds (step 92), the position tracking resumes using the recalibrated position. Attempts to recalibrate position can continuously loop until success occurs, or until persistent failure dictates other corrective action, such as rebooting.

Figure 3A:
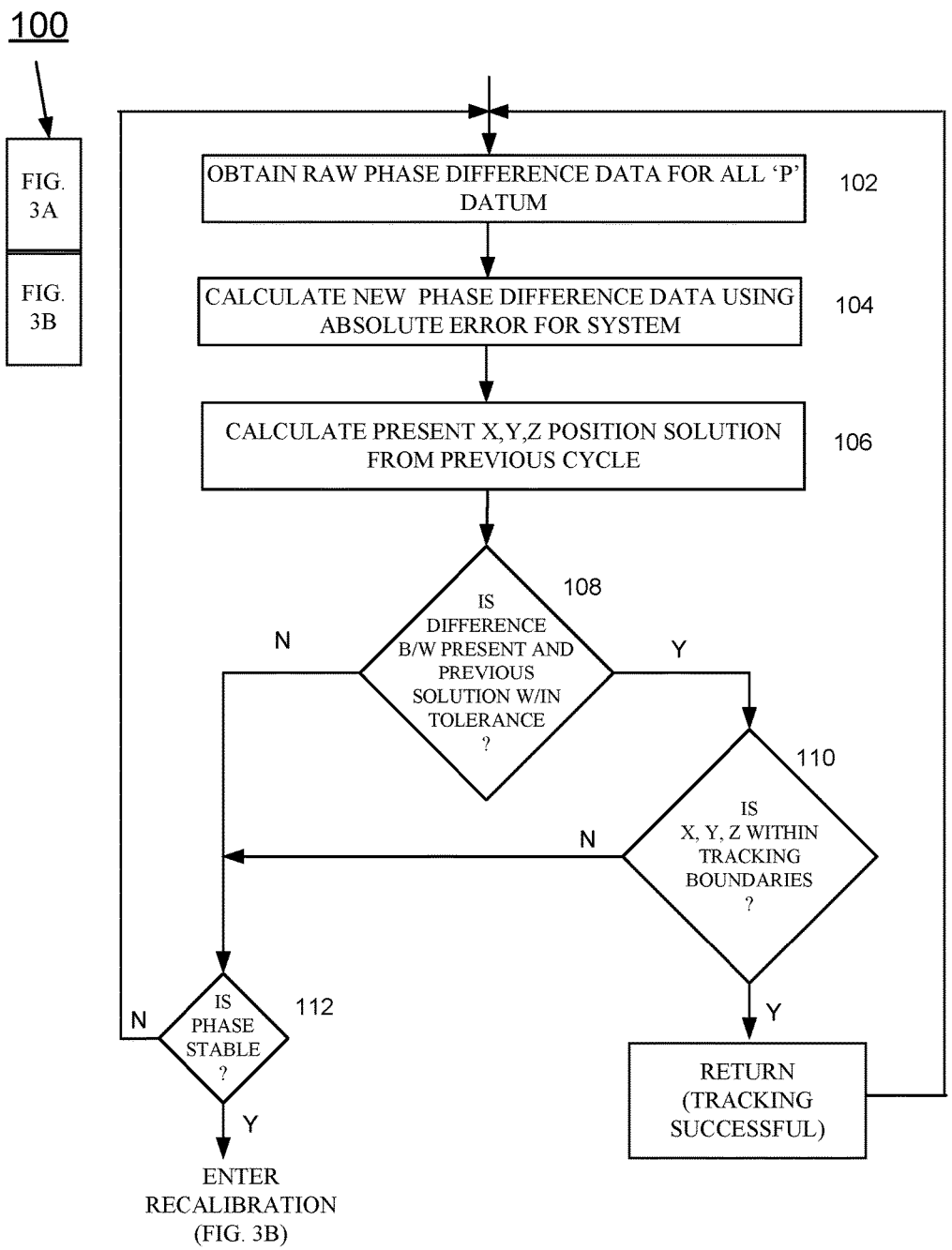
FIG. 3A and FIG. 3B are flowcharts of an embodiment of the position recalibration process.
Figure 3B:
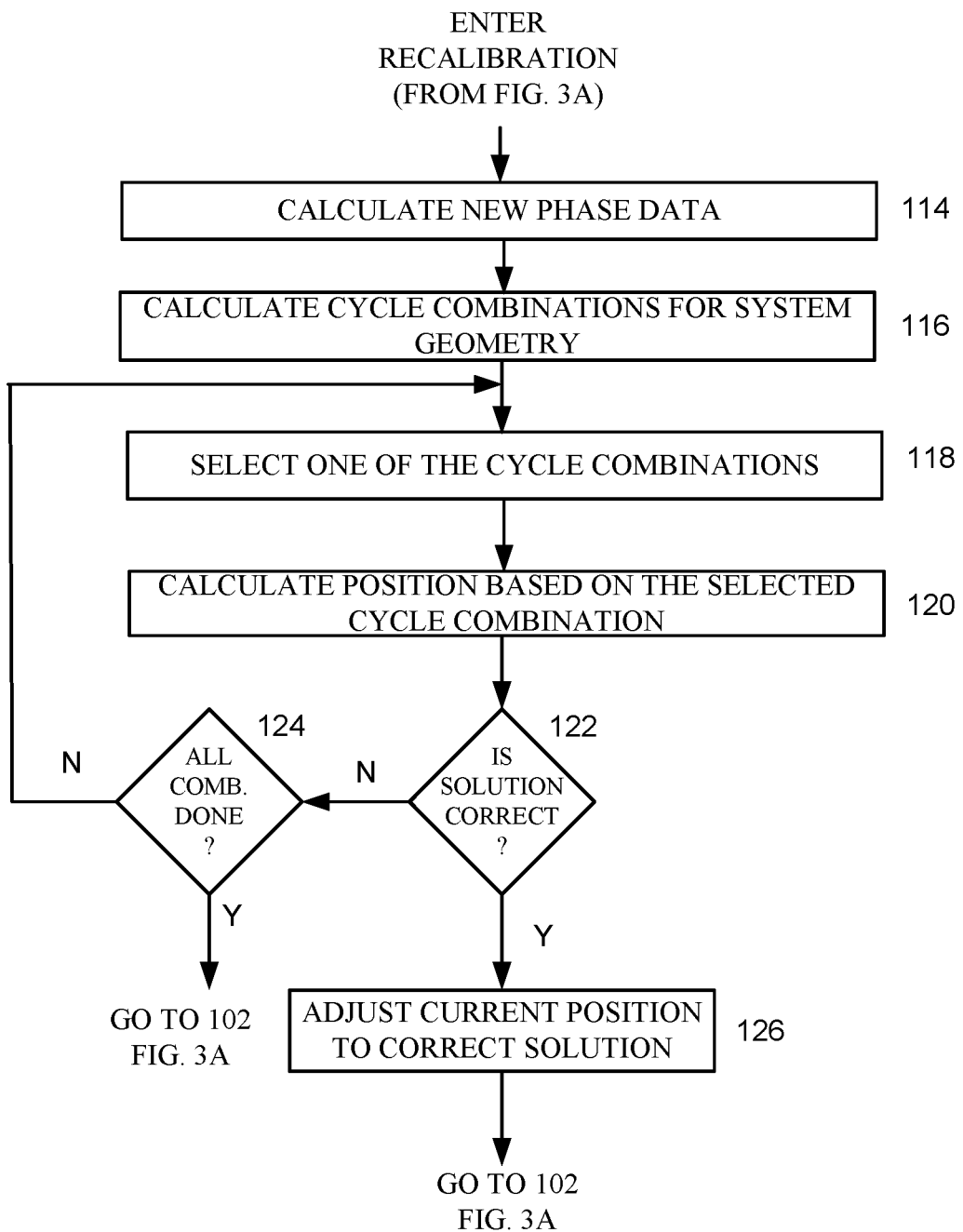

FIG. 3A and FIG. 3B show an embodiment of a process 100 for position tracking that includes position recalibration in the event the position of the RF-transmitting device become lost. Position recalibration can be incorporated into the basic tracking algorithm (FIG. 2), which solves the equations above using least squares, Kalman filtering, or other techniques known in the art. In the description of this process 100, reference is made to the elements of FIG. 1. In one embodiment, data processor 14 performs the calculations herein described. As is known in the art, these calculations can be performed elsewhere, in other associated processing means. In block 102, the receiver channel 13 obtains raw (unprocessed) phase difference data from the antennas 12. From this phase difference data, the data processor 14 calculates (step 104) new phase difference data, which includes the time difference of arrival between each antenna and the reference antenna, using the absolute phase difference error of the system 10 (step 84, FIG. 2). From this new phase difference data, the data processor 14 calculates (step 106) a present position of the RF-transmitting device. Additionally, the data processor 14 has access to the position solution from the previous position calculation cycle.

Validation of the position solution then occurs. Based on the success or failure of the validation, the position tracking process 100 either returns to the tracking algorithm (step 86, FIG. 2), or performs a position recalibration process (step 90, FIG. 2). The first validation (step 108) checks whether the previous and present solution differ by a predetermined tolerance (tol1). For example, the validation can perform the tolerance test as follows:
Does $\|x[p]-x[p-1]\|\mu<tol1$, and $\|y[p]-y[p-1]\|<tol1$, and $\|z[p]-z[p-1]\|<tol1$, where [p] is the present solution, [p-1] is the previous solution, x, y, and z are the position coordinates, and tol1 is the predefined tolerance (i.e. 0.01 meters)? Although only one tolerance (tol1) in noted, each solution component could have a different tolerance. In addition, the tolerance can vary, based on other criteria, for example, varying with the velocity of the RF transmitter.

A second validation verifies (step 110) whether the present position solution is within an acceptable tracking volume. The user or manufacturer of the tracking system can define this tracking volume, which serves to place realistic limits on the tracking solution. For example, it can be determined that a tracking position beyond z=4 meters results in unreliable position determination due to signal drop off. Accordingly, z=4 can then be one of the limits placed on the viable tracking volume.

If either of the first and second validation fails, signifying that position tracking has failed, the process 100 determines (step 112) whether the phase is stable. After position tracking fails, the position recalibration can occur only with stable phase data, such as occurs when the RF-transmitting device is held steady. The process of determining a stable phase includes acquiring and analyzing new phase data for a predetermined number of samples and confirming that the phase has stayed relatively constant across these samples. The definition of "stable," and the length of time that stability is maintained, can be programmable or based on known conditions. Looping through the two validations (108, 110) and the phase stability process (112) can continue indefinitely until all conditions are met to satisfy the recalibration requirements.

FIG. 3B shows the position recalibration process, which calculates new phase difference data by adding the absolute phase error of the system (step 84, FIG. 2) to the raw phase difference data obtained in step 102, FIG. 3A. (New_phase{p}=absolute_phase_error{p}+raw_phase_data{p}). The new phase data is converted to cyclic data so that the resulting phase data is between ±180 degrees. (New_phase{p}=New_phase{p}-360° round(New_phase{p}/360°)).

After the new phase difference data are calculated, the possible position solutions are calculated. Because the normal position solution space is vast when the wavelength λ is much smaller than the tracking distance, some means of checking only viable possible solutions serves to greatly reduce the number of candidate position solutions, and, thus, facilitate processing performance. One embodiment reduces the number of candidates by calculating position solutions based on the geometry of the receiver antennae and the new phase difference data. For example, a gridded search over a predefined volume surrounding the last known position can be used to evaluate phase measurements against the anticipated phase measurements. Only "k" position solutions that yield an integer number of cycles (i.e., are an integer number of wavelengths) from the last known position in any x, y, z direction are selected (step 116) as candidates for evaluation. These "k" candidate position solutions, also referred to as cycle combinations, are saved for use in steps 118, 120, 122, and 124.

In one embodiment, the position recalibration process seeks a first correct (i.e., acceptable) solution. At step 120, one of the "k" candidate position solutions is selected. This candidate position is evaluated (e.g., using a least squares position algorithm). This can be the same least squares position algorithm used during normal position tracking; alternatively, the least squares position algorithm can be custom specific to this operation; or this least squares position algorithm can be programmable to accommodate either one. The position solution from the least squares algorithm is evaluated in block 122. Evaluation can consist of various metrics, including, for example, the size of the residual errors, and the location of the position solution, or combinations thereof, as is known in the art. If the candidate position solution is found to be acceptable, position recalibration is considered successful; control returns to the position-tracking process (FIG. 2, block 86), with the acceptable position solution becoming (step 126) the current position of the RF-transmitting device from which the tracking process resumes. Otherwise, the next "kth" cycle combination is selected in block 118 for evaluation in the least squares routine. This loop continues (step 124) until either an acceptable candidate position solution is found or all "k" cycle combinations have been evaluated. If all "k" combinations are evaluated and found unacceptable, a new set of raw phase data (FIG. 3A, block 102) is obtained, after which, phase stability is retested (provided position determination continues to fail in steps 108 or 110), and the recalibration section of the process is re-entered. As an alternative technique, all "k" candidate position solutions can be tested first before selecting a best position solution and returning that best position solution to the position tracking process.

As will be appreciated by one skilled in the art, aspects of the present invention may be embodied as a system, method, and computer program product. Thus, aspects of the present invention may be embodied entirely in hardware, entirely in software (including, but not limited to, firmware, program code, resident software, microcode), or in a combination of hardware and software. All such embodiments may generally be referred to herein as a circuit, a module, or a system. In addition, aspects of the present invention may be in the form of a computer program product embodied in one or more computer readable media having computer readable program code embodied thereon.

The computer readable medium may be a computer readable storage medium, examples of which include, but are not limited to, an electronic, magnetic, optical, electromagnetic, infrared, or semiconductor system, apparatus, or device, or any suitable combination thereof. As used herein, a computer readable storage medium may be any non-transitory, tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof. A computer readable storage medium can be any computer readable medium that is not a computer readable signal medium such as a propagated data signal with computer readable program code embodied therein.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include C, C++, Pascal, JAVA, BASIC, Smalltalk, Visual Basic, and Visual C++.

Transmission of program code embodied on a computer readable medium can occur using any appropriate medium including, but not limited to, wireless, wired, optical fiber cable, radio frequency (RF), or any suitable combination thereof.

The program code may execute entirely on a user's device, partly on the user's device, as a stand-alone software package, partly on the user's device and partly on a remote device or entirely on a remote device. Any such remote device may be connected to the user's device through any type of network, including a local area network (LAN) or a wide area network (WAN), or the connection may be made to an external device (for example, through the Internet using an Internet Service Provider).

Additionally, the methods of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, or the like.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The methods illustrated herein however can be readily implemented in hardware and/or software using any known or later developed systems or structures, devices and/or software by those of ordinary skill in the applicable art from the functional description provided herein and with a general basic knowledge of the computer arts.

While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents, and variations that are within the spirit and scope of this invention.

What is claimed is:

1. A method of tracking a position of a radiofrequency (RF)-transmitting device based on RF signals transmitted by the RF-transmitting device, comprising the steps of:
    calculating a present position of a RF-transmitting device based on RF signals transmitted by the RF-transmitting device;
    determining the present position of the RF-transmitting device is an invalid position by comparing the present position of the RF transmitting device with boundaries of a predefined acceptable tracking volume;
    recalibrating, in response to determining the present position of the RF-transmitting device is an invalid position, the present position of the RF-transmitting device by:
        obtaining data from RF signals transmitted by the RF-transmitting device; and
        identifying a plurality of candidate position solutions;
        evaluating at least one of the plurality of candidate position solutions against the obtained data to search for an acceptable candidate position solution; and
    when the evaluating finds an acceptable candidate position solution, tracking the RF-transmitting device using the acceptable candidate position solution as the present position of the RF-transmitting device.

2. The method of claim 1, wherein each candidate position solution is an integer number of wavelengths away from a last known position of the RF-transmitting device.

3. The method of claim 1, wherein determining the present position of the RF-transmitting device is an invalid position includes:
    calculating a distance between the present position of the RF-transmitting device and a previous position of the RF-transmitting device; and
    determining the present position of the RF-transmitting device is an invalid position when the calculated distance exceeds a predefined tolerance.

4. The method of claim 1, further comprising verifying stability of the RF-transmitting device before attempting to recalibrate the present position of the RF-transmitting device.

5. The method of claim 1, wherein the obtained data are phase difference data.

6. The method of claim 1, wherein evaluating at least one of the plurality of candidate position solutions against the obtained data to search for an acceptable candidate position solution includes using a least squares algorithm to evaluate the at least one of the plurality of candidate position solutions.

7. The method of claim 1, wherein evaluating at least one of the candidate position solutions against the obtained data to search for an acceptable candidate position solution includes using a Kalman algorithm to evaluate the at least one of the plurality of candidate position solutions.

8. The method of claim 1, wherein evaluating at least one of the plurality of candidate position solutions against the obtained data to search for an acceptable candidate position solution includes evaluating multiple candidate position solutions of the plurality of candidate position solutions against the obtained data before selecting one of the evaluated candidate position solutions as the acceptable candidate position solution.

9. The method of claim 1, further comprising limiting a number of the plurality of candidate position solutions based on a geometry of antennae that receive the RF signals transmitted by the RF-transmitting device and on the data obtained the RF signals.

10. A position tracking system for tracking a position of a radiofrequency (RF)-transmitting device based on RF signals transmitted by the RF-transmitting device, the system comprising:
a network of four or more spatially separated antennas fixed at different locations, the four or more antennas receiving RF signals sent from the RF-transmitting device; and
a data processor configured to calculate a present position of a RF-transmitting device based on the RF signals received by the four or more antennas, the data processor being further configured to:
determine the present position of the RF-transmitting device is an invalid position by comparing the present position of the RF transmitting device with boundaries of a predefined acceptable tracking volume;
recalibrate, in response to determining the calculated present position of the RF-transmitting device is an invalid position, the present position of the RF-transmitting device by:
obtaining data from RF signals transmitted by the RF-transmitting device;
identifying a plurality of candidate position solutions; and
evaluating at least one of the plurality of candidate position solutions against the obtained data to search for an acceptable candidate position solution; and
track the RF-transmitting device using the acceptable candidate position solution as the present position of the RF-transmitting device when the evaluating finds an acceptable candidate position solution.

11. The position tracking system of claim 10, wherein each candidate position solution is an integer number of wavelengths away from a last known position of the RF-transmitting device.

12. The position tracking system of claim 10, wherein the data processor is configured to determine the present position of the RF-transmitting device is an invalid position by:
calculating a distance between the present position of the RF-transmitting device and a previous position of the RF-transmitting device; and
determining the present position of the RF-transmitting device is an invalid position when the calculated distance exceeds a predefined tolerance.

13. The position tracking system of claim 10, wherein the data processor is further configured to verify stability of the RF-transmitting device before attempting to recalibrate the present position of the RF-transmitting device.

14. The position tracking system of claim 10, wherein the data obtained from RF signals transmitted by the RF-transmitting device are phase difference data.

15. The position tracking system of claim 10, wherein the data processor is configured to evaluate the at least one of the plurality of candidate position solutions against the obtained data using a least squares algorithm.

16. The position tracking system of claim 10, wherein the data processor is configured to evaluate the at least one of the plurality of candidate position solutions against the obtained data using a Kalman algorithm.

17. The position tracking system of claim 10, wherein the data processor is configured to evaluate multiple candidate position solutions of the plurality of candidate position solutions against the obtained data before selecting one of the evaluated candidate position solutions as the acceptable candidate position solution.

18. A method of tracking a position of a radiofrequency (RF)-transmitting device based on RF signals transmitted by the RF-transmitting device, comprising the steps of:
calculating a present three-dimensional (3D) position of a RF-transmitting device based on RF signals transmitted by the RF-transmitting device;
calculating a distance between the present 3D position of the RF-transmitting device and a previously calculated 3D position of the RF-transmitting device;
determining the present 3D position of the RF-transmitting device is an invalid position when the present 3D position of the RF transmitting device exceeds boundaries of a predefined acceptable tracking volume;
recalibrating, in response to determining the present 3D position of the RF-transmitting device is an invalid position, the present 3D position of the RF-transmitting device by:
obtaining data from RF signals transmitted by the RF-transmitting device;
calculating a plurality of candidate 3D position solutions;
evaluating at least one of the candidate 3D position solutions against the obtained data to search for an acceptable candidate 3D position solution; and
when the evaluating finds an acceptable candidate 3D position solution, tracking the RF-transmitting device using the acceptable candidate 3D position solution as the present 3D position of the RF-transmitting device.

* * * * *